Oct. 21, 1969 I. BERLIN 3,474,319

SOLID STATE MOTOR CONTROL

Filed Feb. 2, 1967

INVENTOR
IRVING BERLIN
BY Arthur M. Sloan
ATTORNEY

United States Patent Office 3,474,319
Patented Oct. 21, 1969

3,474,319

SOLID STATE MOTOR CONTROL

Irving Berlin, Dallas, Tex., assignor to Varo, Inc., Garland, Tex.

Filed Feb. 2, 1967, Ser. No. 613,540
Int. Cl. H02k 27/20
U.S. Cl. 318—331 4 Claims

ABSTRACT OF THE DISCLOSURE

A planar silicon controlled rectifier or other comparable solid state device having increased sensitivity for gate triggering as a salient feature is energized from an alternating current source and supplies power to an inductive load. Variable control is provided for unidirectional power supplied through a half wave planar silicon controlled rectifier to a rotating machine which has substantial inductance. The invention does not "cog" or "cycle-skip" at low speeds and thus provides much greater useable speed range than prior art controls from a few r.p.m. to maximum half-wave speed of the motor. In addition the invention has a more uniform "feedback" response than prior art controls.

In many industrial and commercial tool applications, it is often desirable to control the speed of operation. This is necessary in drill presses, bench lathes, and hand tools such as drills, jig saws, and electrically operated screwdrivers.

There are several well known methods available for controlling the speed of motor driven tools. One of the more common methods is to lower the speed through gear reduction. Another way is through the use of a rheostat in series with the motor. These prior art methods are either costly, bulky or inefficient. A better way to control motor speed is through the use of proportional power control in accordance with this invention.

Before the advent of semiconductors, vacuum tube thyratrons were used to achieve proportional control in speed control systems. These vacuum tubes had relatively short lifetimes and used excessive power.

Semiconductors, and thyristors in particular, are efficient, have relatively long lifetimes and are economically suitable for use in proportional power control systems.

Operation of the thyristor family of semiconductor devices is described in a number of readily available sources in the literature. One recommended reference is "Semiconductor Controlled Rectifiers," by Gentry et al., published by Prentice-Hall, Inc., 1964. Only such description of the operation of thyristors as is required for the understanding of the control system of this invention will be given in this disclosure.

This invention relates generally to circuits using a planar silicon controlled rectifier. The advantage of planar silicon controlled rectifiers over diffused silicon controlled rectifiers is evident in the current level required to trigger or turn ON the silicon controlled rectifier. The current required to trigger the planar silicon controlled rectifier is typically 100 microamps versus 10 milliamps required for a diffused silicon controlled rectifier. In other words, the planar silicon controlled rectifier requires only one hundredth the amount of gate current required to turn ON a diffused silicon controlled rectifier.

A major advantage of a planar silicon controlled rectifier is immediately apparent when viewing the physical size of the circuit components. With planar silicon controlled rectifiers a high impedance firing circuit can be used thereby greatly diminishing the power to be dissipated in the resistors and reducing the size of the components by a large margin. This enables the entire circuit to be adapted to miniaturized configurations.

More specifically, this invention relates to planar SCR's energized from an alternating current source and supplying power to an inductive load. This invention is specially adapted to circuits which use a single phase half wave planar SCR delivering a unidirectional current to an inductive load.

This invention has application to the variable control of unidirectional power supplied through a half wave SCR to a rotating machine which has substantial inductance such as a series wound or universal motor, the field winding of the generator of a Ward Leonard type variable speed drive, the excitation winding of an eddy current or hysteresis clutch or coupling, or in some cases the field or armature of a separately excited motor.

One object of the invention is to provide a simple control system which permits the use of a single planar SCR for supplying both the armature and field of the motor.

Another object of the invention is to provide a wide range of control of both the armature and field voltages of the motor to enable the motor speed to be adapted over a wide range.

A further object of the invention is to provide such a system which enables the speed of the motor to be controlled in such a manner as to remain substantially constant at a selected value irrespective of fluctuations in the load on the motor.

Yet another object of the invention is to provide a control system utilizing a planar SCR.

Still a further object of the invention is to provide a high impedance firing speed control circuit with reduced component size such that the circuit lends itself to miniaturization.

With the above and other objects in view as will hereinafter appear, the invention comprises the devices combinations and arrangements of parts hereinafter set forth and illustrated in the accompanying drawings of a preferred embodiment of the invention, from which the several features of the invention and the advantages derived therefrom will be readily understood by those skilled in the art.

Figure 1:
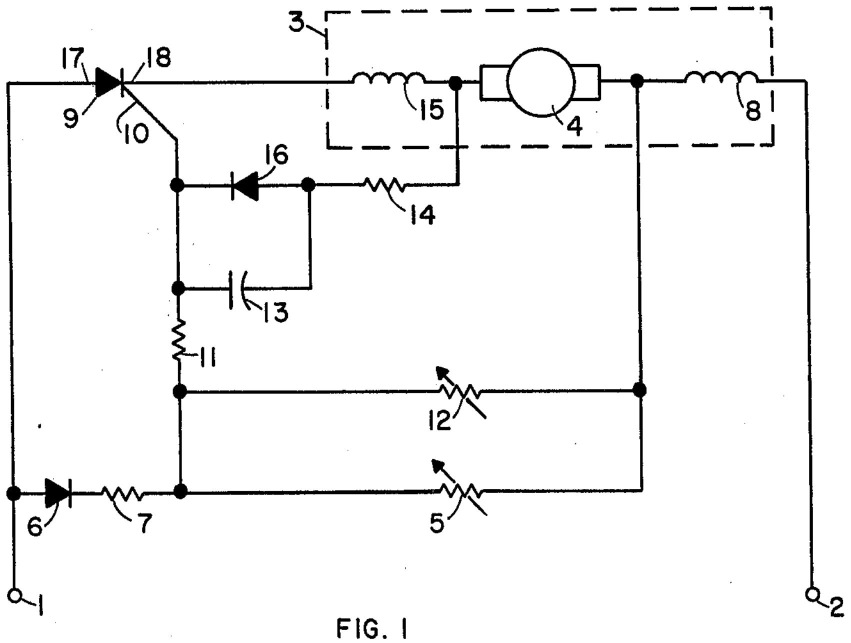
FIGURE 1 is a schematic arrangement of an electrical circuit embodying the features of the invention.

FIGURE 1 illustrates a schematic arrangement of an electrical circuit which is used to achieve the above mentioned objectives. The circuit of FIGURE 1 provides a means for controlling voltage to a motor load thereby also controlling the speed of a series or universal motor. The circuit operates as follows:

When the two terminals 1 and 2 are connected to a source of alternating current when the motor 3 is at a standstill, in order for operation of the motor to commence, the planar SCR 9 must be triggered ON. This can occur only when the following conditions are met:

(1) The voltage on the anode electrode 17 of the planar SCR 9 must be positive with respect to the cathode electrode 18.

(2) The voltage on the gate 10 of the planar SCR 9 must be positive and of sufficient magnitude to fire the SCR 9.

The speed of the motor 3 is determined by the voltage across the motor armature 4 which in turn is determined by the portion of the positive half cycle that the planar SCR 9 is conductive. The conduction period and firing angle of the planar SCR 9 are determined by the magnitude and polarity of the voltage applied to the planar SCR 9 through the gate electrode 10.

The speed setting reference voltage is provided by connecting a potentiometer 5, in series with a blocking rectifier 6 and a resistor 7, to a common termination connecting the motor armature 4 and one point of motor field 8. Since the blocking rectifier 6 has the same polarity as planar SCR 9, the speed setting voltage or gate voltage is of the same half cycle as that of the motor 3. The reference voltage is applied to the gate electrode 10 of planar SCR 9 through a resistor 11 which is connected to a common termination between resistor 7 and potentiometer 5.

Resistor 7, potentiometer 5, resistor 11, potentiometer 12, and capacitor 13 constitute a phase shift network which controls the conduction period and firing angle of planar SCR 9.

Planar SCR 9 fires when the voltage on capacitor 13 reaches the minimum gate voltage (typically 0.6 v.) to fire the planar SCR 9, thereby permitting voltage to appear across the motor 4.

The voltage on capacitor 13 is the resultant of the feedback voltage derived through resistor 14 from the junction of motor field winding 15 and the armature 4 and a small alternating current voltage which lags the supply voltage by approximately 90 degrees. The feedback voltage is filtered by capacitor 13 to form a direct current voltage level which determines the firing angle of planar SCR 9.

Capacitor 13 also acts as a "memory" of the voltages existing during the preceding power half cycle, during which the speed was sensed by the ratio of armature to field voltages.

Figure 2:
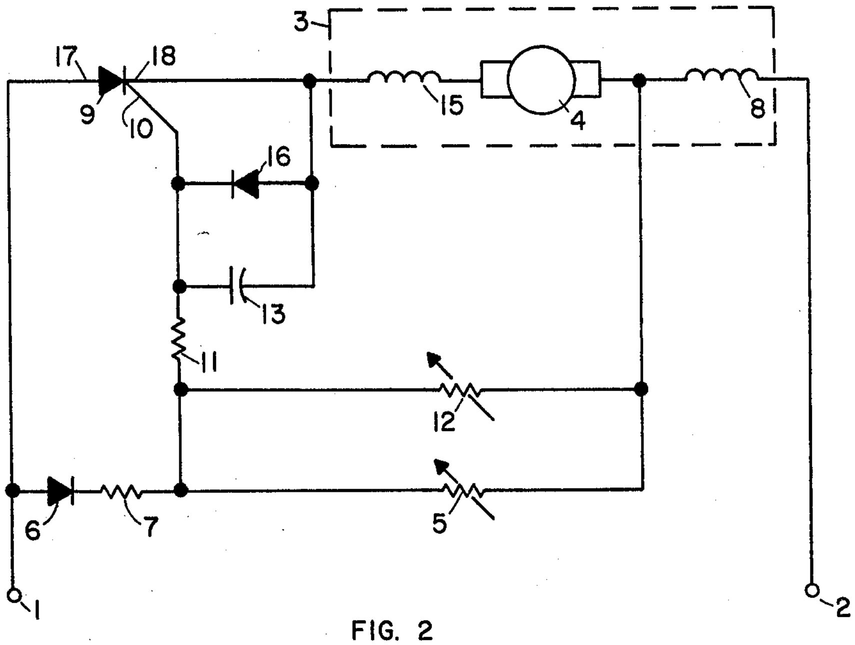
FIGURE 2 is a schematic diagram of a modified version of the circuit of FIGURE 1.

Diode 6 in both FIGS. 1 and 2 acts as a half-wave rectifier. Therefore, as mentioned supra, the speed setting voltage or gate voltage originally is of the same half-cycle as that of the motor. However, a pulsating D.C. is obtained, which is dropped in potential by resistor 7 and resistor 11, and then appears as a "small A.C. voltage" which is then shifted in phase by potentiometer 5, potentiometer 12, and capacitor 13. This small A.C. voltage is then riding at a D.C. level on capacitor 13, influenced by the potential between armature 4 and field 8.

During the negative half-cycle, BACK EMF causes a slight increase on the D.C. level of capacitor 13 causing SCR 9 to fire earlier during the next positive half-cycle. Capacitor 13, therefore, serves as a "memory," which as mentioned above helps trigger the SCR 9 earlier or later depending on the level of BACK EMF generated during the previous negative half-cycle.

Once the $V_{GT}$ (minimum gate voltage to fire the SCR 9) is reached, SCR 9, "fires" and capacitor 13 is discharged through gate electrode 10.

If the motor is not saturated, its field flux is proportional to field current and also to field voltage. The BACK EMF of the armature is proportional to field flux multiplied by speed. Therefore if ratio of BACK EMF to field voltage is constant, the motor speed will remain constant.

Therefore the "armature voltage," col. 3, l. 26, is the "BACK EMF" to field voltage ratio. Any deviations in motor loading would tend to result in speed change. However by the capacitor charging earlier in the cycle, the speed change will therefore be "sensed" and cause the ratio of BACK EMF to field voltage to remain constant by delivering more power to the motor.

Potentiometer 12 acts as a "range" control. By paralleling potentiometer 5 with potentiometer 12 the resistance of potentiometer 5 is electrically reduced, thereby lowering the maximum speed of the motor. Since the mechanical rotation will remain the same, a greater degree of speed selection is then available. A minimum resistance should be incorporated in potentiometer 12 to insure that the maximum speed is not reduced to impractical limits. If range control is not desirable potentiometer 12 can be moved to an "open" position.

Diode 16 clamps or limits the reverse voltage on the gate electrode 10 to a value equaling the forward voltage drop of the diode 16 (approximately 0.35 volt) to protect the gate electrode 10 from excessive reverse voltages. In addition to the reference function supplied by the network of potentiometer 5, potentiometer 12 and capacitor 13 in conjunction with half-wave rectifier circuit diode 6, resistor 7 and resistor 11, through field 8, a comparator bridging effect is achieved by isolating potentiometer 5 and potentiometer 12 from the A.C. line. A by product of this arrangement is that field 8 acts as a choke during the negative half-cycle and suppresses spurious signals on the A.C. line. This keeps irregular signals from interfering with the reference voltage thereby yielding a more precise, more uniform charge on capacitor 13.

In the circuit of FIGURE 2 the resistor 14 has been omitted and the feedback source is between cathode electrode 18 of SCR 9 and the motor field winding 15.

As noted, both the circuits of FIGURE 1 and FIGURE 2 use planar silicon controlled rectifiers which are silicon controlled rectifiers manufactured using the planar process. The advantage of a planar SCR over a diffused SCR is evident in the current level required to trigger or turn ON the silicon controlled rectifier.

As further noted, the current required to trigger the planar silicon controlled rectifier is typically 100 microamps as opposed to 10 milliamps required for a diffused silicon controlled rectifier. As a result, the planar silicon controlled rectifier requires only one hundredth the amount of gate current required to turn on a diffused SCR. Accordingly, the high impedance firing circuit of this invention can be used, greatly diminishing power dissipation in the resistors and reducing the size of the components.

What I claim as new and desire to secure by Letters Patent of the United States is:

1. A solid state motor control which enables the speed of a motor to be controlled, to remain substantially constant at a selected value regardless of fluctuation in the load on the motor including a planar silicon controlled rectifier which is energized by an alternating current source for supplying power to both the armature and field of the motor, said motor having first and second field windings, and means for determining the conduction period and firing angle of the planar silicon controlled rectifier to control the speed of the motor in which the means for determining the conduction period and firing angle of the planar silicon controlled rectifier to control the speed of the motor is a phase shift network which includes a first resistor connected at one end to a line from the anode electrode of the planar silicon controlled rectifier for connection to an alternating current source and at its other end to a line from the gate electrode of the planar silicon controlled rectifier, a first potentiometer connected at one end to the first resistor at its junction with the line from the gate electrode of the planar silicon controlled rectifier, and its other end to a line connected between the armature of the motor to be controlled and one of the armature motor field windings, a second resistor connected between the gate electrode of the planar silicon controlled rectifier and the first resistor, a second potentiometer in parallel with the first potentiometer and connected at one end between the first and the second resistors and a capacitor connected at one end between the gate electrode of the silicon controlled rectifier and the second resistor and at its other end between the cathode electrode of the planar silicon controlled rectifier and the other armature motor field winding, and wherein the end of the first armature motor field winding remote from the end connected to the first and second potentiometers is provided with means for connection to an alternating current source.

2. A solid state motor control as described in claim 1 including a diode which acts as a blocking rectifier connected between the line running from the anode electrode of the planar silicon controlled rectifier and the first resistor with its cathode electrode connected to the first resistor, said diode having the same polarity as the planar silicon controlled rectifier so that the speed setting reference voltage is of the same half cycle as that of the motor to be controlled.

3. A solid state motor control as described in claim 2 including a diode connected in parallel with the capacitor with its cathode electrode connected to the gate electrode of the planar silicon controlled rectifier wherein the diode limits the reverse voltage on the gate electrode to a value equaling the forward voltage drop of the diode to protect the gate electrode of the planar silicon controlled rectifier.

4. A solid state motor control as described in claim 3 including a third resistor connected at one end to the anode of the diode connected to the gate electrode of the planar silicon controlled rectifier and at its other end between the armature of the motor to be controlled and the second motor field winding, the feedback voltage being derived through said resistor.

References Cited

UNITED STATES PATENTS

| | | | |
|---|---|---|---|
| 3,271,648 | 9/1966 | Weed | 318—331 |
| 3,278,821 | 10/1966 | Gutzwiller | 318—331 |
| 3,319,591 | 5/1967 | Hamlett | 318—331 XR |
| 3,313,012 | 4/1967 | Long et al. | |

ORIS L. RADER, Primary Examiner

ROBERT J. HICKEY, Assistant Examiner